US012613897B1

(12) United States Patent
 Chen

(10) Patent No.: US 12,613,897 B1
(45) Date of Patent: Apr. 28, 2026

(54) METHOD FOR AUTOMATICALLY MAPPING FIELDS HAVING SIMILAR CHARACTERISTICS

(71) Applicant: OwlTing USA, Inc., Arlington, VA (US)

(72) Inventor: Cheng-Wei Chen, New Taipei City (TW)

(73) Assignee: OwlTing USA, Inc., Arlington, VA (US)

( * ) Notice: Subject to any disclaimer, the term of this patent is extended or adjusted under 35 U.S.C. 154(b) by 0 days.

(21) Appl. No.: 19/194,018

(22) Filed: Apr. 30, 2025

(51) Int. Cl.
 *G06F 16/334* (2025.01)
 *G06F 16/22* (2019.01)
 *G06F 16/23* (2019.01)
 *G06F 40/30* (2020.01)

(52) U.S. Cl.
 CPC ...... *G06F 16/3347* (2019.01); *G06F 16/2237* (2019.01); *G06F 16/2358* (2019.01); *G06F 40/30* (2020.01)

(58) Field of Classification Search
 CPC ............. G06F 16/3347; G06F 16/2358; G06F 16/2237; G06F 40/30
 See application file for complete search history.

(56) References Cited

U.S. PATENT DOCUMENTS

| | | | | |
|---|---|---|---|---|
| 10,616,337 | B1 * | 4/2020 | Satyanarayana | .... H04L 67/1097 |
| 12,524,809 | B1 * | 1/2026 | Krull | ...................... G06Q 40/04 |
| 2016/0140204 | A1 * | 5/2016 | Brown | .................. G06F 16/254 |
| | | | | 707/602 |
| 2021/0136072 | A1 * | 5/2021 | Hutcherson | ......... H04L 63/0892 |
| 2022/0247800 | A1 * | 8/2022 | Matula | .................. H04L 63/101 |
| 2022/0253962 | A1 * | 8/2022 | Wright | .................. G06Q 10/40 |
| 2025/0272499 | A1 * | 8/2025 | Neagovici | .............. G06F 40/30 |
| 2026/0004080 | A1 * | 1/2026 | Varshney | ............... G06F 40/30 |

* cited by examiner

*Primary Examiner* — Etienne P Leroux

(74) *Attorney, Agent, or Firm* — Winston Hsu

(57) ABSTRACT

A system includes a processor, a memory, a storage medium, and a network interface. The system is configured to receive data from a first dataset and a second dataset. The system is configured to perform a method, including monitoring changes in the database structure, extracting metadata, embedding text fields, building an index, performing similarity searches, retrieving similar fields, using a RAG framework, a Machine Learning predicting, and comparing the results.

15 Claims, 3 Drawing Sheets

200

201 Monitoring and Metadata Extraction

202 Data Preprocessing Phase

204 Word Embedding Phase

206 Retrieval Augmented Generation phase

208 Machine Learning phase

210 Comparison Phase

METHOD FOR AUTOMATICALLY MAPPING FIELDS HAVING SIMILAR CHARACTERISTICS

BACKGROUND OF THE INVENTION

1. Field of the Invention

The present invention relates to a method utilized at least one artificial intelligence models for automatically identifying redundant fields and automatically concatenating similar fields.

2. Description of the Prior Art

Data redundancy in a database system means that the same or similar information is stored in a plurality of places or a plurality of tables. This may be unnecessary as it increases the storage requirements of the database and may cause consistency issues when updating. Data redundancy can negatively impact database performance and efficiency and make data more difficult to maintain. When designing a database, data redundancy is usually minimized to ensure consistency and effective management of data.

Redundant fields in a table should be deleted to ensure consistency and effective management of fields. Similar fields in two tables can be linked to ensure consistency and effective management of fields.

Furthermore, when two software systems are functionally connected, it requires APIs (application programming interfaces) integration between the two systems. A developer may need to read through all the API documentation to correspond the correct field names from a system to another, and it takes huge time and energy to find the correct field names in a complex system.

SUMMARY OF THE INVENTION

An embodiment according to the present invention provides a method for automatically mapping fields having similar characteristics from a first dataset to a second dataset. The method includes:monitoring, by a processor, changes in a database structure during updates to the first dataset and extracting modified fields as metadata; performing data cleaning operations, by the processor, on the metadata to unify the formality of the metadata and standardize field descriptions;

embedding multiple text fields of the metadata into a plurality of vectors respectively by at least one language embedding model for capturing semantic relations; building an index for a vector database, wherein the vector database is populated with the plurality of vectors from the second dataset; selecting a target field from the first dataset to identify the similar matches in the second dataset; averaging the plurality of vectors from the first dataset corresponding to the selected target field to obtain an average vector; performing a similarity search against the vector database by using the average vector to return a ranked list of the semantically similar vector embeddings in the second dataset, along with their associated fields; retrieving a set of top-N most similar fields in the second dataset to use as context for a large language model; feeding a prompt to the large language model, wherein the prompt includes: target field information of the first dataset, a retrieved context from the set of top-N most similar fields in the second dataset, and instruction of providing the most similar fields; identifying, by the large language model, the set of top-N most similar fields of the second dataset based on the prompt to output a first most similar field in the second dataset having a similar characteristics to the field of the first dataset; partitioning, by the processor, the first dataset, the second datasets, and the plurality of vectors thereof, into a training set, a testing set, and a validation set; inputting, into a classification machine learning model, vector representations of field names, descriptions, average values, and data types, as input features associated with the fields of the first and second datasets; training, by the processor, the classification machine learning model using the training set, the training comprising using historical labeled field correspondence data as labels, wherein a label indicates a similarity or non-similarity between a field of the first dataset and a field of the second dataset; predicting, by the classification machine learning model, a similarity between a field of the first dataset and a field of the second dataset to output a second most similar fields in the second dataset having a similar characteristic to the field in the first dataset; generating, by the processor, a mapping relationship between the first dataset and the second dataset if the first most similar field identified by the LLM is identical to the second most similar field predicted by the ML model; repeating, by the processor, the steps of selecting a target field through generating a mapping relationship, until the fields in the first dataset have all been processed, to create a list of mapping relationships between the first dataset and the second dataset; and storing, by the processor, the list of mapping relationships in a computer-readable storage medium.

These and other objectives of the present invention will no doubt become obvious to those of ordinary skill in the art after reading the following detailed description of the preferred embodiment that is illustrated in the various figures and drawings.

DETAILED DESCRIPTION

The present disclosure relates to a system and method for automatically mapping fields between disparate datasets, addressing the challenge of data silos and facilitating data integration. The method leverages a combination of dynamic metadata extraction, natural language processing (NLP) techniques, a Retrieval Augmented Generation (RAG) framework with a Large Language Model (LLM), and machine learning (ML) to accurately identify and map fields with similar characteristics, even if they have different names or structures.

System Overview

Figure 1:
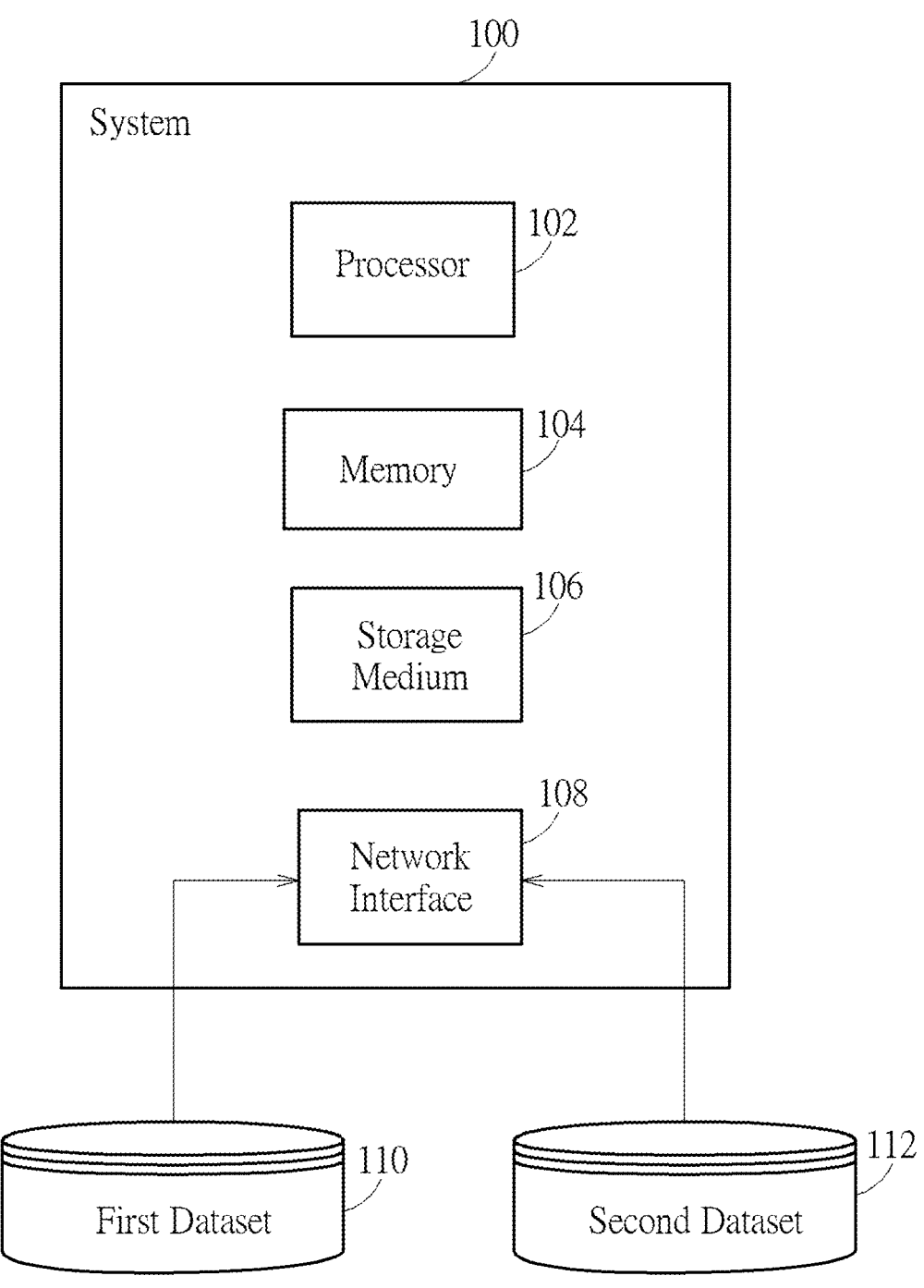
FIG. 1 illustrates a block diagram of an overview of a system according to the present invention.

FIG. 1 illustrates an overview of the system 100. The system 100 includes a processor 102, a memory 104, a storage medium 106, and a network interface 108. The system 100 is configured to receive data from a first dataset 110 and a second dataset 112. The system 100 is configured to perform the method described in this disclosure, including monitoring changes in the database structure, extracting metadata, embedding text data, building an index, performing similarity searches, retrieving similar fields, using a RAG framework, a Machine Learning predicting, and comparing the results.

The processor 102 is configured to execute instructions stored in the memory 104. The memory 104 may include RAM, ROM, or any type of transitory storage medium. The storage medium 106 may include a hard disk drive, a solid-state drive, or other types of non-transitory storage. The network interface 108 allows the system 100 to communicate with other systems and devices over a network, such as API (Application Programming Interface).

The first dataset 110 and the second dataset 112 may be stored in various formats, such as relational databases, NoSQL databases, CSV files, JSON (JavaScript Object Notation) or other data formats.

Data Flow and Method

Figure 2:
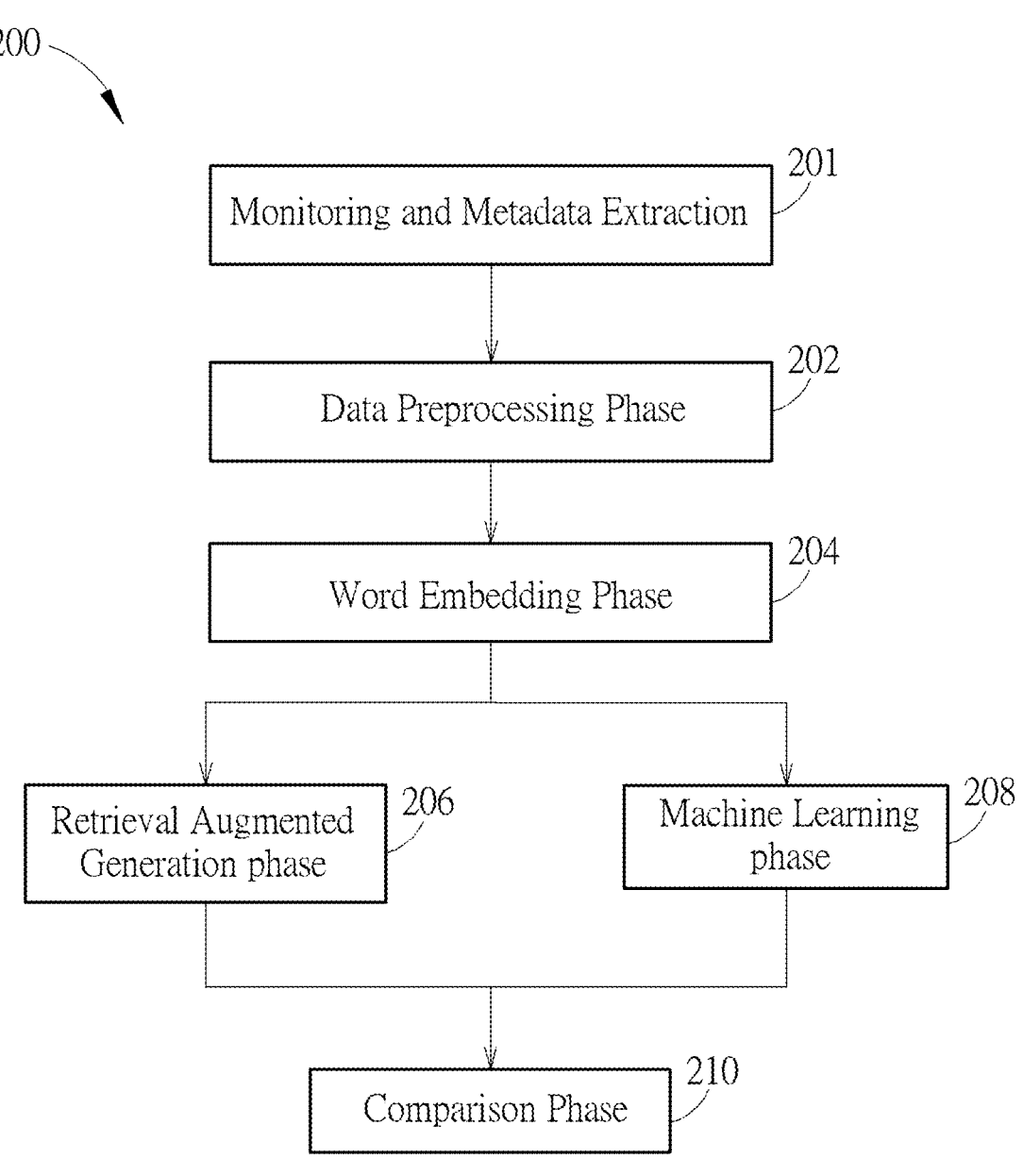
FIG. 2 illustrates a data flow diagram illustrating a method according to the present invention.

FIG. 2 provides a data flow diagram illustrating the method 200. The method 200 includes several phases: monitoring and metadata extraction 201, a data preprocessing phase 202, a word embedding phase 204, a Retrieval Augmented Generation (RAG) phase 206, a Machine Learning (ML) phase 208, and a comparison phase 210.

Monitoring and Metadata Extraction 201:

The process begins by monitoring changes in the database structure of a first dataset 110 during updates. This dynamic monitoring 201 allows the system 100 to capture real-time modifications to the fields, which is more informative than simply analyzing a static schema. The monitoring step 201 includes detecting alterations to field definitions, identifying modified fields, and extracting metadata associated with these fields. Metadata includes, but is not limited to, field name, field description, data type, update time, update frequency, and update counts. This extracted metadata forms the basis for subsequent analysis.

Data Preprocessing Phase 202:

The extracted metadata undergoes the data preprocessing phase 202, which includes performing data cleaning operations to unify the format of the metadata and standardize field descriptions. For example, inconsistencies in naming conventions, abbreviations, or capitalization are addressed. This step ensures that the metadata is consistent and suitable for embedding. This may involve techniques like converting all text to lowercase, removing special characters, expanding abbreviations, and stemming or lemmatizing words. The data cleaning operations include a substep of encoding data type of the metadata into discrete numerals using one-hot encoding, label encoding, frequency encoding, or feature hashing.

Word Embedding Phase 204:

The cleaned metadata, particularly the textual components (field names and field descriptions), is then respectively transformed into a plurality of numerical vector representations using at least one language embedding model for capturing the semantic meaning of the metadata. Particularly, each of the text fields are embedded into a vector.

Index Building for Vector Database:

A specialized vector database is used to store and efficiently search the vector embeddings generated from the second dataset 112. This database is distinct from traditional relational databases, as it is optimized for similarity searches based on vector distances. An index is built within the vector database to facilitate this rapid retrieval. This index maps vector embeddings to the corresponding metadata of the fields in the second dataset 112. The index stores the vector representations of the fields in the second dataset 112 and includes an index key representing the vector representations and an index value representing the field of the corresponding vector in the second dataset 112.

The vector database is populated with the vector representations from the second dataset 112. The at least one language embedding model belongs to a category of a natural language processing model. The vector database may be a non-transitory database configured to store and perform approximate nearest neighbor (ANN) searches on high-dimensional vector embeddings. For instance, suitable vector databases may be from one of the libraries of FAISS, Pinecone™, or Weaviate™. The at least one language embedding model includes a static embedding model, a contextualized embedding model, a sentence embedding model, and a universal sentence encoder. The static embedding model can be chosen from, but not limited to, Word2Vec, GloVe, FastText (which is efficient for field names). The contextualized embedding model can be chosen from, but not limited to, BERT or RoBERTa (which is powerful for capturing context). The sentence embedding model can be chosen from, but not limited to, SBERT (which is remarkable for semantic similarity of field descriptions). The Universal Sentence Encoder is used for general-purpose sentence embeddings.

Selecting a Target Field:

A target field is selected from the first dataset 110 to identify the similar matches in the second dataset 112.

Average Vector Calculation:

The system 100 allows the user to construct the query vector by averaging the vector embedding from a set of selected fields related to the target field from the first dataset. An average vector is obtained by averaging the vector representations corresponding to the plurality of fields. The average vector represents the combined semantic meaning of the selected fields.

Generating the query vector comprises selecting a plurality of fields related to the target field from the first dataset, and averaging the vector representations corresponding to the plurality of fields to obtain an average vector.

Retrieval Augmented Generation (RAG) Phase 206:

The RAG phase 206 combines the power of vector-based retrieval with the reasoning capabilities of a Large Language Model (LLM).

Similarity Search:

The average vector is used as a query vector to perform a similarity search against the vector database (which contains indexed embeddings of the second dataset's fields 112). The vector database, utilizing its internal index, returns a ranked list of the most semantically similar vector embeddings, along with the associated fields' metadata. The retrieval process involves finding the top-N vector averages of the fields most similar to the vector average of the selected field, wherein n is a positive integer.

Context Retrieval:

A spared set of top-N most similar fields from the second dataset 112 is retrieved based on the similarity search results, where n can be any positive integer. The spared set of top-N most similar fields is temporary and is used for context retrieval. These fields and their associated metadata (names, descriptions, data types, etc.) serve as the retrieved context for the LLM.

Prompt Construction:

A carefully constructed prompt is fed to the LLM. This prompt typically includes: The target field information (name, description, data type) from the first dataset 110, which is calculated by using the average vector, the retrieved context (the top-N similar fields and their metadata) from the second dataset 112, and an instruction for the LLM to identify the most similar fields.

For instance, the prompt may be sequentially structured by first giving the LLM an identity (e.g., "You are a helpful assistant for mapping fields between datasets"), clearly stating the task (e.g., "Determine whether the following fields are related"), and presenting both field information and the retrieved context (e.g., "comprehensively analyzing both file paths and value in context of a product logic to make an informed decision").

LLM-Based Augmentation:

The LLM, leveraging its understanding of natural language and the provided context, analyzes the prompt and augments the most similar field(s) from the second dataset 112. This result constitutes a first most similar field in the second dataset 112, which has a most similar characteristic to at least one field in the first dataset 110.

Machine Learning (ML) Phase 208:

In parallel with the RAG phase 206, a machine learning approach is used to provide an alternative method for field mapping.

Data Partitioning:

The vector embeddings of the fields from the first and second datasets 110, 112, the first datasets 110, and the second dataset 112 are all partitioned into training, testing, and validation sets. This partitioning is used for training and evaluating the machine learning model. The partitioning could be done on pairs of fields based on existing labeled field correspondence data. The similarity is evaluated using the validation set. A performance threshold of the machine learning algorithm is tested using the testing set.

Input Features:

The machine learning model uses, as input features, vector representations of field names, descriptions, average values, data types and optionally, update time, update frequency, and update counts associated with the fields. These features are derived from the preprocessed metadata and vector embeddings.

Model Training:

A classification machine learning model is trained using the training set. Historical labeled field correspondence data serves as labels, where a label indicates whether a pair of fields (one from the first dataset 110 and one from the second dataset 112) is similar (1) or not similar (0). The ML model learns to predict the similarity between fields based on the input features. Various classification models can be used, including: Neural Networks: Suitable for all dimensions, particularly high-dimensional data; Logistic Regression: Appropriate for binary classification and providing probabilities of field similarity; Decision Trees/Random Forests: Handle non-linear relationships between features, suitable for more complex redundancy detection; Support Vector Machines (SVM): Effective for high-dimensional vector data and identifying similarities; and Gradient Boosting Machines (GBM): Build complex models through iterative combinations of weaker learners, often achieving high accuracy.

Model Prediction:

The trained classification machine learning model predicts the similarity between a field from the first dataset 110 and a field from the second dataset 112. This prediction results in a second most similar field. The model performance will be measured by metrics including accuracy, precision, recall, and F1-score. The accuracy is used to measure the overall correctness of the model's predictions on the datasets. The precision is to assess the accuracy of the model in predicting redundant fields, i.e., the proportion of predicted redundant fields that are actually redundant. The recall is used to measure the proportion of actual redundant fields that are correctly predicted as redundant. The F1 score is the harmonic mean of precision and recall, used to balance the importance of both metrics.

Comparison Phase 210:

The output of the RAG phase 206 (first most similar field) and the output of the ML phase 208 (second most similar field) are compared. The goal of this step is to identify the fields that are the same by both large language model and classification machine learning model. Repeating the RAG phase 206 and the ML phase 208 to output a matched field list from the first dataset 110 to the second dataset 112 until all of the fields of the first dataset 110 have been processed.

Field Mapping Relationship Generation and Storage:

Based on the matched field list, field mapping relationships between the first dataset 110 and second dataset 112 are generated. These relationships indicate which fields in the first dataset 110 correspond to and have very similar characteristics to which fields in the second dataset 112. These generated field mapping relationships are stored in a computer-readable storage medium for later use in data integration, data migration, or other data management tasks.

Redundant Field Mapping Embodiment

The system 100 can be used to identify redundant fields. In this embodiment, "similarity" is interpreted broadly. Due to field limitations, data that should originally correspond to the same address might be split into two or more rows in certain databases, leading to missing field mappings and resulting in redundant fields (e.g., "customer\_name" and "client\_name," "contact_address" and "current_residential_address," "mobile_phone" and "contact phone/mobile phone").

In the data preprocessing phase 202, by monitoring changes in the database structure during updates to the first dataset 110 and extracting modified fields, the metadata 102 could include a plurality of fields each comprising a field name, a field description, a data type, an update time, an update frequency and an update count.

For example, in Field 1: field name is "address", field description is "current address", data type is "string", update time is "14:50", update frequency is "3 times/day", and update count is "102".

In Field 2: field name is "phone", field description is "current phone number", data type is "string", update time is "9:25", update frequency is "2 times/day", and update count is "20".

In Field 3: field name is "cellphone", field description is "current cellphone number", data type is "string", update time is "9:25", update frequency is "2 times/day", and update count is "20".

Since Field 1 is different from Field 2 and Field 3 in all attributes except for data type, Field 1 is not considered redundant and should be retained. However, Field 2 and Field 3 have similar field names and descriptions, and identical data types, update times, update frequencies, and update counts. Field 2 and Field 3 are similar. Therefore, Field 2 and Field 3 are redundant fields, and one of them should be removed.

The metadata of the Field 2 would be: {"field name": "phone", "description": "current phone number", "data_type": "string", "update_time": "9:25", "update_frequency": "2 times/day", "update_count": "20" }. The metadata of the Field 3 would be: {"field_name": "cellphone", "description": "current cellphone number", "data_type": "string", "update_time": "9:25", "update_frequency": "2 times/day", "update count": "20" }. After the word embedding phase 204, the vectors of Field 2 and Field 3 would be [0.2, 0.5, . . . , 0.1] and [0.8, 0.1, . . . , 0.9].

The RAG phase 206, particularly with the LLM's ability to understand semantic nuances, can identify fields that have similar meanings or purposes even if their names are different. After performing the similarity search, retrieving the spared set of top-N most similar fields, and feeding a prompt to the large language model. The prompt, for instance, could be: "You are Mapping-Key-AI, designed to autonomously determine whether fields are related from two different datasets. 0 for false (not related), and 1 for true (related). When assessing the relevance, you should comprehensively analyze both the 'json_path' and the 'value' in the context of the product logic to make an informed decision".

The large language model could identify the fields from JSON documents and generate the first most similar field in the second dataset 112.

In the machine learning phase 208, the machine learning model, trained on historical data that includes examples of redundant fields, can also learn to recognize these patterns. This is especially useful for finding potentially overlapping data within an organization.

For example, the spared set of top-5 most similar fields could be listed like this:

```
"assets.totalBalance": {
    "input_map_row": {
        "json_ path": "assets.totalBalance",
        "value": "Total balance"
    },
    "topn_ref_map_rows": [
        {"json_path" : "'common.text.total_balance'",
            "value": "Total Balance",
            "is_full_match": 0,
            "similarity": 1.0
        },
        {"json_path": "' common.text.total_amount'",
            "value": "Total amount",
            "is_full_match": 0,
            "similarity": 0.8809850215911865
        },
        {"json_path":"'billing_statement.amount_title'",
            "value": "Total Amount:",
            "is_full_match": 0,
            "similarity": 0.866083025932312
        },
        {"json path": "' common.text.balance'",
            "value": "Balance",
            "is_full_match": 0,
            "similarity": 0.8442966341972351
        },
        {"json path": "'wallet_detail_confirm.asset_balanc
e'",
            "value": "Asset balance",
            "is_full_match": 0,
            "similarity": 0.8324577808380127
        }
    ]
```

The first and second set similar fields could be chosen from the spared set of top-5 most similar fields like this:

```
"matched_ref_map_rows_by_agent": [
    {"json path": "'common.text.total_balance'",
        "value": "Total Balance",
        "is_full_match": 0,
        "similarity": 1.0
    }
],
```

In the similarity search, the similarity search could be incorrect or not precise, the LLM is able to read the context and choose the first field from the top-5 most similar fields of the second dataset without being affected by a result of the similarity search. In parallel to the LLM phase 206, the ML phase 208 also predicts the second field in the second dataset. When the first field and the second field are identical, the first field (or the second field) in the second dataset and the corresponding field in the first dataset are matched. In the comparison phase 210, the LLM phase 206 and the ML phase 208 are repeatedly performed until the fields in the first dataset 110 are all processed. Those fields are identified as the field mapping relationships between the first dataset 110 and the second dataset 112. The fields which have similarity less than "1.0" are considered as not fully matched, but still have the possibility to belong to the redundant fields.

A tolerance threshold can be used for grouping the fields having different similarity values. For instance, if the tolerance threshold is set as "0.87," the fields of 'common. text.total_balance,' and 'common.text.total_amount,' belong to a matched group. On the other hand, the fields of 'billing statement.amount_title,' 'common.text.balance,' and 'wallet_detail_confirm.asset_balance' belong to an uncertain group and may need further determination.
Identical Field Mapping:

The system 100 can also be used to identify identical fields. In this embodiment, similarity is interpreted more strictly. The comparison phase 210 would look for exact matches in field names, at least under the meaning of language (or other predefined criteria for "identical"). This is useful for ensuring data consistency across datasets. The prompt for LLM can be modified to ask for "exactly same" mapping.

By combining the strengths of RAG, machine learning, and dynamic metadata extraction, this system 100 provides a robust and accurate solution for automatically field-mapping across disparate datasets. Those fields between the two datasets can be redundant while having similar characteristics or be identical.
GUI for Field Mapping Visualization and Adjustment In one embodiment, the system 100 can provide a graphical user interface (GUI) to visualize the field mapping relationships between the first and second datasets 110, 112 and to allow users to manually adjust these mappings.

Figure 3:
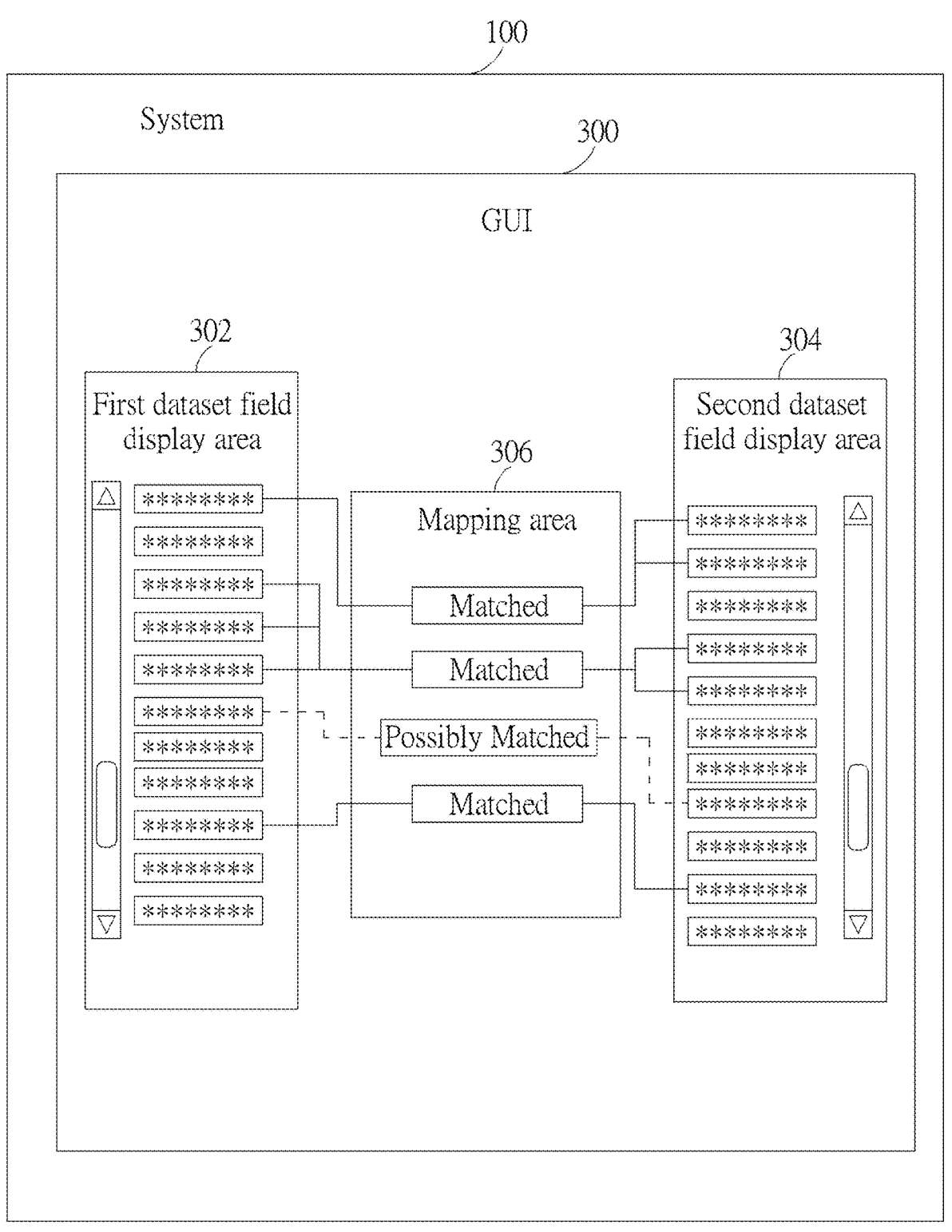
FIG. 3 illustrates a graphical user interface for visualizing field mapping relationships.

FIG. 3 shows an example GUI 300 for visualizing and adjusting field mappings. The GUI 300 includes a first dataset field display area 302, a second dataset field display area 304, and a mapping area 306. The first dataset field display 302 shows a scrollable list of fields from the first dataset 110. Each field entry includes metadata such as the field name, data type, and format. This provides a clear overview of the available fields in each dataset. Similarly, the second dataset field display 304 shows a scrollable list for representing each field's name, data type, and format from the second dataset 112. The mapping area 306 visually represents the mappings between fields in the first and second datasets 110, 112. Matched fields are connected by lines, providing a clear visual representation of the correspondence. Users can manually create or adjust field mappings by dragging a field from either the first or second dataset field display area (302 or 304) and dropping it onto the corresponding field in the mapping area 306. This allows users to prioritize or re-order the mappings, which can be important when multiple fields in the second dataset 112 are potential matches for a single field in the first dataset. When a user drags a field, other fields adjust their positions accordingly, maintaining a consistent visual representation. The intuitive drag-and-drop interface provides direct control over the mapping process. A drag-and-drop library, such as HTML5 Drag and Drop API or a JavaScript library like React DnD or Dragula, is used to implement this functionality.

The mapping area 306 visually connects matched fields with lines for providing immediate visual feedback on the current mapping configuration. The lines can be styled (e.g., color-coded) to indicate the strength of the match (e.g., based on the similarity score) or the source of the mapping (automatic vs. manual). The GUI 300 initially displays the automatically generated field mappings (from the RAG and/or ML phases 206, 208). Users can then review these mappings and manually adjust them using the drag-and-drop functionality. Incorrect matches can be deleted (by removing the connecting line), and new matches can be created by dragging and dropping.

The GUI 300 allows users to export the finalized field mapping configuration (including manual adjustments). The mappings can be converted into various formats, including format code, JSON format, or other API format. The format code corresponds to a particular data transformation. The JSON format can provide a structured, human-readable format suitable for data exchange. The API formats are compatible with specific APIs for data integration or migration. This export functionality ensures that the user-defined mappings can be readily integrated into other systems and workflows.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for automatically mapping fields having similar characteristics from a first dataset to a second dataset, comprising:

monitoring, by a processor, changes in a database structure during updates to the first dataset and extracting modified fields as metadata;

performing data cleaning operations, by the processor, on the metadata to unify the formality of the metadata and standardize field descriptions;

embedding multiple text fields of the metadata into a plurality of vectors respectively by at least one language embedding model for capturing semantic relations;

building an index for a vector database, wherein the vector database is populated with the plurality of vectors from the second dataset;

selecting a target field from the first dataset to identify the similar matches in the second dataset;

averaging the plurality of vectors from the first dataset corresponding to the selected target field to obtain an average vector;

performing a similarity search against the vector database by using the average vector to return a ranked list of the semantically similar vector embeddings in the second dataset, along with their associated fields;

retrieving a set of top-N most similar fields in the second dataset to use as context for a large language model;

feeding a prompt to the large language model, wherein the prompt comprises: target field information of the first dataset, a retrieved context from the set of top-N most similar fields in the second dataset, and instruction of providing the most similar fields;

identifying, by the large language model, the set of top-N most similar fields of the second dataset based on the prompt to output a first most similar field in the second dataset having a similar characteristic to the field of the first dataset;

partitioning, by the processor, the first dataset, the second datasets, and the plurality of vectors thereof, into a training set, a testing set, and a validation set;

inputting, into a classification machine learning model, vector representations of field names, descriptions, average values, and data types, as input features associated with the fields of the first and second datasets;

training, by the processor, the classification machine learning model using the training set, the training comprising using historical labeled field correspondence data as labels, wherein a label indicates a similarity or non-similarity between a field of the first dataset and a field of the second dataset;

predicting, by the classification machine learning model, a similarity between a field of the first dataset and a field of the second dataset to output a second most similar field in the second dataset having a similar characteristic to the field in the first dataset;

generating, by the processor, a mapping relationship between the first dataset and the second dataset if the first most similar field identified by the LLM is identical to the second most similar field predicted by the ML model;

repeating, by the processor, the steps of selecting a target field through generating a mapping relationship, until the fields in the first dataset have all been processed, to create a list of mapping relationships between the first dataset and the second dataset; and storing, by the processor, the list of mapping relationships in a computer-readable storage medium.

2. The method of claim 1, wherein the step of monitoring comprises:

detecting alterations to field definitions within the first dataset and the second dataset;

identifying modified fields resulting from the detected alterations; and extracting metadata associated with the identified modified fields.

3. The method of claim 1, wherein the step of predicting is evaluated based on a performance determined by at least one of metrics comprising accuracy, precision, recall, and F1 score.

4. The method of claim 1, wherein the prompt is sequentially structured by giving an identity of the LLM being for mapping fields, pointing out the task of the LLM is to determine whether two different fields are related, and comprehensively analyzing field names, descriptions, average values, and data types in context of a logic to facilitate a decision.

5. The method of claim 1, wherein the step of partitioning comprises a machine learning algorithm is applied using the training set to identify the fields in the second dataset having similar characteristics to the fields of the first dataset, the similarity being evaluated using the validation set, and a performance threshold of the machine learning algorithm being tested using the testing set.

6. The method of claim 1, wherein the at least one language embedding model comprises a static embedding model, a contextualized embedding model, a sentence embedding model, and a universal sentence encoder.

7. The method of claim 1, wherein the step of performing data cleaning operations further comprises encoding data type of the metadata into discrete numerals.

8. The method of claim 1, wherein the vector database is a non-transitory database for storing and performing approximate nearest neighbor searches on high-dimensional vector embeddings.

9. The method of claim 1, wherein the step of averaging the plurality of vectors comprises generating a query vector for the similarity search;

wherein generating the query vector comprises selecting a plurality of fields related to the target field from the first dataset, and averaging the vector representations corresponding to the plurality of fields to obtain the average vector.

10. The method of claim 1, wherein the multiple text fields comprise field name and field description.

11. The method of claim 1, wherein the vector representations further comprises update time, update frequencies and update counts as the victor features.

12. The method of claim 1, wherein the target field and the training set belong to redundant fields for mapping high-possibility of redundant intersection fields between the first and second datasets.

13. The method of claim 1, further comprising displaying a graphical user interface for visualizing and adjusting field of the list of mapping relationships between the first dataset and the second dataset, wherein the graphical user interface includes a first display area for listing fields of the first dataset, a second display area for listing fields of the second dataset, and a mapping area for visually representing mappings between the fields.

14. The method of claim 13, wherein the graphical user interface provides drag-and-drop functionality for manually creating, adjusting, and re-ordering field mappings between the first dataset and the second dataset, the mapping area visually connects matched fields with lines.

15. The method of claim 13, further comprising exporting the field the list of mapping relationships, as modified through the graphical user interface, into a format selected from the group consisting of format code, JSON format, and an API format.

* * * * *